(12) United States Patent
Hack et al.

(10) Patent No.: US 7,031,819 B2
(45) Date of Patent: Apr. 18, 2006

(54) DEVICE AND METHOD FOR INFLUENCING THE OPERATING MODE OF AT LEAST ONE VEHICLE STABILIZING DEVICE ARRANGED IN A VEHICLE

(75) Inventors: Albert Hack, Sindelfingen (DE); Franz Himler, Frohnleiten (AT); Gerd Linzmayer, Koeflach (AT)

(73) Assignee: DaimlerChrysler AG, Stuttgart (DE)

( * ) Notice: Subject to any disclaimer, the term of this patent is extended or adjusted under 35 U.S.C. 154(b) by 47 days.

(21) Appl. No.: 10/505,841

(22) PCT Filed: Feb. 20, 2003

(86) PCT No.: PCT/EP03/01734

§ 371 (c)(1),
(2), (4) Date: Apr. 20, 2005

(87) PCT Pub. No.: WO03/072410

PCT Pub. Date: Sep. 4, 2003

(65) Prior Publication Data
US 2005/0228568 A1 Oct. 13, 2005

(30) Foreign Application Priority Data
Feb. 28, 2002 (DE) .................... 102 08 645

(51) Int. Cl.
*G06F 7/00* (2006.01)
*G06F 17/00* (2006.01)

(52) U.S. Cl. .................... 701/82; 701/81; 701/82; 701/83; 701/88; 475/150; 475/198; 475/199

(58) Field of Classification Search ............. 475/223; 701/70, 71, 78, 81, 83, 88, 82
See application file for complete search history.

(56) References Cited

U.S. PATENT DOCUMENTS 4,462,271 A * 7/1984 Stieg ..................... 475/86
4,768,399 A * 9/1988 Kubo et al. ............. 475/223

(Continued)

FOREIGN PATENT DOCUMENTS

DE    3205268 A1 *   8/1983
DE    3542417 A1     6/1987

(Continued)

OTHER PUBLICATIONS

Copy of International Preliminary Examination Report with English translation.

*Primary Examiner*—Cuong Nguyen
(74) *Attorney, Agent, or Firm*—Crowell & Moring LLP (57) ABSTRACT

A plurality of vehicle stabilizing devices which operate according to different strategies and which actuate, independently of the driver, brake actuators which are assigned to the vehicle wheels, in order to stabilize the vehicle are arranged in the vehicle. The vehicle is equipped with at least one switchable differential lock in the drive train. The differential lock assumes a non-switched operating state, a first operating state in which the differential lock is preselected, and a second operating state in which the differential lock is switched. When the differential lock assumes the first operating state, some of the vehicle stabilizing devices, other than that vehicle stabilizing device which, by actuating the brake actuators independently of the driver, prevents the vehicle wheels from locking during a braking operation, are influenced in terms of their operating mode. When the differential lock assumes the second operating state, all the vehicle stabilizing devices are influenced in their operating mode. The operating mode of the vehicle stabilizing devices is influenced in such a way that the actuation of the brake actuators which is independent of the driver does not occur.

13 Claims, 3 Drawing Sheets

U.S. PATENT DOCUMENTS

| | | | |
|---|---|---|---|
| 4,770,266 A * | 9/1988 | Yamaguchi et al. | 180/197 |
| 5,057,062 A * | 10/1991 | Yamasaki et al. | 475/221 |
| 5,418,727 A | 5/1995 | Ikeda et al. | |
| 5,545,103 A * | 8/1996 | Gustin | 475/223 |
| 5,611,750 A * | 3/1997 | Kono et al. | 477/65 |
| 5,897,601 A * | 4/1999 | Suzuki | 701/78 |
| 6,550,320 B1 * | 4/2003 | Giustino | 73/146 |
| 6,638,194 B1 * | 10/2003 | Ishikawa et al. | 475/198 |
| 2001/0023799 A1 * | 9/2001 | Engelhard | 188/151 R |
| 2002/0035002 A1 * | 3/2002 | Ishikawa et al. | 475/203 |
| 2003/0144786 A1 * | 7/2003 | Hessmert et al. | 701/82 |
| 2004/0267427 A1 * | 12/2004 | Suzuki et al. | 701/69 |

FOREIGN PATENT DOCUMENTS

| | | |
|---|---|---|
| DE | 3835906 A1 | 4/1990 |
| DE | 4221045 A1 | 1/1993 |
| DE | 19641101 A1 | 4/1998 |
| DE | 19748251 A1 * | 5/1998 |
| DE | 19921064 A1 | 11/2000 |
| DE | 19955620 A1 | 5/2001 |
| EP | 191131 A2 * | 8/1986 |
| EP | 0191131 A2 | 8/1986 |
| EP | 0191131 B1 | 7/1991 |
| EP | 0487862 A1 | 6/1992 |
| EP | 1059216 A2 | 12/2000 |
| JP | 03290103 A * | 12/1991 |
| JP | 05004532 A * | 1/1993 |
| JP | 05221250 A * | 8/1993 |

* cited by examiner

DEVICE AND METHOD FOR INFLUENCING THE OPERATING MODE OF AT LEAST ONE VEHICLE STABILIZING DEVICE ARRANGED IN A VEHICLE

BACKGROUND AND SUMMARY OF THE INVENTION

The invention relates to a device and a method for influencing the operating mode of at least one vehicle stabilizing device which is arranged in a vehicle.

Vehicle stabilizing devices are known nowadays in a wide variety of forms. Examples of these are brake assistants (BAS), brake slip controllers (ABS), traction slip controllers (ASR), electronic traction systems (ETS) or vehicle movement dynamic controllers (ESP). These vehicle stabilizing devices have one thing in common: they actuate, independently of the driver, at least brake actuators which are assigned to the vehicle wheels, in order to stabilize the vehicle. These vehicle stabilizing devices have proven effective in the road mode. They contribute to better control of vehicles and to reducing accidents.

Against this background it is understandable that, if possible, a large proportion of the vehicles taking part in road traffic should be equipped with such vehicle stabilizing devices. This also applies to vehicles with all-wheel drive or off-road vehicles because the advanced possibilities of the vehicle stabilizing devices specified above should also be made available in these vehicles. Finally, it is desirable to make road traffic as safe as possible and to reduce the risk of accidents as far as possible.

In vehicles with all-wheel drive, to be more precise in off-road vehicles in which the long-proven mechanical locks are used for hard or extreme off-road use, which is referred to as the off-road mode, problems may occur if the vehicle is operated with the mechanical locks activated and one of the vehicle stabilizing devices specified above actuates, independently of the driver, one of the brake actuators assigned to the vehicle wheels during such an operating state of the vehicle, that is to say a braking intervention which is independent of the driver is carried out. These aforesaid off-road vehicles have three mechanical differential locks. As a result, when differential locks are activated, one hundred percent mechanical coupling of the front and rear axle differentials are ensured and furthermore the front and the rear axles are also mechanically coupled by means of the differential lock in the transfer gear. If the braking intervention which is independent of the driver is carried out in the case of such a mechanical coupling of the axles, this leads to the braking forces being displaced via the axles which are now "rigid". In other words, the braking force is not only generated at the one vehicle wheel whose brake actuator is actuated, but also at the other vehicle wheels owing to the "rigid" axles. This leads to an undesired vehicle behavior.

The prior art discloses various devices which are concerned with the problems described above.

For example, German document DE 196 41 101 A1 discloses a method for controlling a longitudinal lock of an all-wheel-driven vehicle. In order to bring about better driving comfort, the longitudinal lock is automatically closed when there is a load change. However, apparatuses such as an antilock brake system or a vehicle movement dynamic system are preferred in order to ensure undiminished driving stability and braking stability of the vehicle. That is to say, when the chassis control or brake control is actuated, the longitudinal lock is not taken into account, with respect to the load change. Moreover, when there is a braking operation initiated by the driver of the vehicle, if the longitudinal lock is closed, it is opened immediately. In summary, the following can be inferred from German document DE 196 41 101 A1: if a braking intervention which is dependent on a driver or a braking intervention which is independent of a driver is to be carried out, this braking intervention is given priority and the longitudinal lock is opened up or even not closed in the first place.

European document EP 0 191 131 B1 is further prior art. In this document, a road vehicle is proposed with an antilock protection in which the front wheels are controlled individually and the rear wheels are controlled according to the select-low principle. The driven rear axle is provided with a differential lock which can be switched on. In order to increase the stability of the vehicle when the differential lock is engaged, an apparatus is provided which detects the engagement of the lock and, when the lock is engaged, switches over the logic of the antilock protection electronic system of the front axle from individual control (IR) to a modified individual control (MIR), a select low control (SLR) or some other control logic which attenuates the yaw moment and steering torque, at the front wheels. From European document EP 0 191 131 B1 which is to be considered as forming the generic type, the following can thus be inferred: the operating mode of a vehicle stabilizing device which actuates, independently of the driver, at least brake actuators which are assigned to the vehicle wheels, in order to stabilize the vehicle, is influenced in terms of its operating mode as soon as the longitudinal lock assumes an operating state other than the non-switched operating state.

The vehicle which is described in European document EP 0 191 131 A1 is only equipped with a vehicle stabilizing device, specifically with an antilock protection device. Proposals as to what procedure should be adopted if the vehicle is equipped with a plurality of vehicle stabilizing devices which actuate, independently of the driver, at least brake actuators which are assigned to the vehicle wheels, in order to stabilize the vehicle, are not given in this document.

Against this background, the following object presents itself: the intention is to provide a device which, in vehicles with all-wheel drive or in off-road vehicles which are equipped both with differential locks and with vehicle stabilizing devices which actuate, independently of the driver, at least brake actuators which are assigned to the vehicle wheels, in order to stabilize the vehicle, allows an unrestricted off-road mode of these vehicles, while simultaneously supporting the driver for as long as possible in critical driving situations which may possibly occur.

Unrestricted off-road mode is to be understood to mean the following: a vehicle with all-wheel drive or an off-road vehicle which is equipped with vehicle stabilizing devices, which actuate, independently of the driver, at least brake actuators which are assigned to the vehicle wheels, in order to stabilize the vehicle, despite the presence of the vehicle stabilizing devices is to behave—in the off-road mode with the locks activated—like a vehicle which does not have such vehicle stabilizing devices and in which, consequently, no adverse effects of the vehicle behavior as a result of braking interventions which are independent of the driver can occur during the off-road mode.

This object is achieved by means of claimed features.

According to the invention, in order to achieve the above object in a vehicle in which a plurality of vehicle stabilizing devices which operate according to different strategies are arranged which actuate, independently of the driver, at least brake actuators which are assigned to the vehicle wheels, in order to stabilize the vehicle, and which is equipped with at least one switchable, in particular mechanical, differential lock in the power train, which differential lock assumes a non-switched operating state, and in addition to this non-switched operating state a first operating state which is different from the non-switched operating state and in which the differential lock is preselected, and a second operating state which is different from the non-switched operating state and the first operating state and in which the differential lock is switched, as soon as the differential lock assumes the first operating state, some of the vehicle stabilizing devices are influenced in terms of their operating mode, and as soon as the differential lock assumes the second operating state, all the vehicle stabilizing devices are influenced in terms of their operating mode.

This procedure according to the invention, which corresponds to a stepped procedure, has the following advantage: as long as the differential lock is in the non-switched operating state, there is no rigid coupling between the wheels of a vehicle axle or between the axles of the vehicle, and consequently braking forces which are increased at a wheel cannot be transmitted to other wheels. This means that the brake actuators which are assigned to the vehicle wheels cannot be actuated appropriately for requirements without there being the risk of disruptive effects occurring in the process. There is no need to influence the vehicle stabilizing devices in their operating mode, and consequently their entire functionality is available to support the driver. In contrast, as soon as the differential lock is in the preselected operating state, i.e. in the transition phase between the non-switched operating state and the switched operating state, it can be assumed that within a foreseeable time a rigid coupling may occur between the individual wheels or axles, thus displacing braking forces between the individual wheels. Although, in the preselected operating state, the differential lock is not yet activated, its activation will take place within a short time period. In order to prevent a possibly occurring, disruptive displacement of braking forces, some of the vehicle stabilizing devices are already influenced at this stage in terms of their operating mode. This is a preventative measure, since the time at which the differential lock is activated last and it becomes necessary to influence the vehicle stabilizing devices in terms of their operating mode cannot be determined in advance precisely. Only some of the vehicle stabilizing devices are influenced in terms of their operating mode, specifically those whose support in the transition phase and the associated vehicle state can be dispensed with. The remaining vehicle stabilizing devices are not influenced in their operating mode, and are thus available to support the driver. These are vehicle stabilizing devices whose support should not be dispensed with, even in the transition phase and the associated vehicle state. As a result, stabilization of the vehicle is ensured to a minimum degree. Only if the differential lock is in the switched operating state are the remaining vehicle stabilizing devices also influenced in their operating mode, meaning that all the vehicle stabilizing devices are made available to the driver, at any rate to an only still restricted degree or even are no longer made available. This measure avoids possible displacement of braking forces owing to the coupling between the wheels. The support to the driver by the vehicle stabilizing devices can be dispensed with in such operating states of the vehicle, there are no speeds present, since in such operating states stabilizing braking interventions which are independent of the driver are usually not necessary.

The operating mode of the vehicle stabilizing devices is advantageously influenced here in each case in such a way that the actuation—independent of the driver—of the brake actuators which are assigned to the vehicle wheels, by the respective vehicle stabilizing device does not occur. As a result, if the differential lock assumes an operating state other than the non-switched operating state, i.e. is either preselected or switched or activated, it is ensured that none of the brake actuators which are assigned to the vehicle wheels is actuated independently of the driver, and an increase in braking force or decrease in braking force does not take place at any of the vehicle wheels, which increase or decrease could give rise, in this operating state of the differential lock, to a disadvantageous effect on another vehicle wheel or another vehicle axle and would thus bring about an undesired and eventually disruptive effect on the movement of the vehicle. The advantageous effects—described above—of the respective vehicle stabilizing device corresponds to a deactivation of the respective vehicle stabilizing devices.

As already explained, with the apparatus according to the invention, the vehicle stabilizing devices are influenced incrementally in their operating mode. The following procedure advantageously presents itself: if the differential lock assumes the first operating state, with the exception of that vehicle stabilizing device which, by actuating the brake actuators independently of the driver prevents the vehicle wheels locking during a braking operation, all the vehicle stabilizing devices which are arranged in the vehicle are influenced in terms of their operating mode. As soon as the differential lock assumes the second operating state, this vehicle stabilizing device is also influenced in terms of its operating mode. This measure ensures that this vehicle stabilizing device, which is known to correspond to a brake slip controller, is made available in its full scope to the driver for as long as possible for supporting purposes.

The vehicle which has a front axle and a rear axle is advantageously a vehicle with all-wheel drive. In this vehicle, both the front axle and the rear axle are each effectively assigned a differential lock. That is to say the front axle has a differential gear mechanism with differential lock, referred to below as front axle differential gear mechanism and front axle differential lock, and the rear axle has a differential gear mechanism with differential lock, referred to below as rear differential mechanism and rear differential lock. Furthermore, in the vehicle, a further differential lock is effectively arranged between the front axle and the rear axle. In other words: the vehicle under consideration has a transfer gear, composed of a differential gear mechanism and a differential lock, for dividing the torque between the front axle and the rear axle. This differential gear mechanism and this differential lock are referred to below as longitudinal differential gear mechanism and longitudinal differential lock.

According to the invention, the operating mode of the vehicle stabilizing device is influenced as soon as the differential lock which is arranged between the front axle and the rear axle, i.e. the longitudinal differential lock, assumes an operating state other than the non-switched operating state. The influencing of the operating mode of the vehicle stabilizing device is aimed at the longitudinal differential lock for the following reason: in a vehicle with all-wheel drive which is equipped with the abovementioned three differential locks, said locks are preselected and activated in the sequence longitudinal differential lock, then rear axle differential lock and, finally, front axle differential lock. That is to say, the longitudinal differential lock is inevitably always activated irrespective of which of the three differential locks is activated last. Consequently, for the decision as to whether or not it is necessary to influence the operating mode of the vehicle stabilizing device, it is sufficient to monitor whether the longitudinal differential lock is preselected.

In a transition of the differential lock from the non-switched operating state into the switched operating state, the first operating state is assumed before the second operating state. Here, the switched operating state corresponds to the second operating state. In the non-switched operating state, the differential lock is not activated. In the switched operating state, the differential lock is activated. The first operating state which is specified above corresponds to a transition operating state between the non-switched operating state and the switched operating state.

Advantageously, at least one brake slip controller (ABS) and one brake assistant (BAS) and/or one traction slip controller (ASR) and/or one electronic traction system (ETS) and/or one vehicle movement dynamics controller (ESP) are arranged in the vehicle as vehicle stabilizing devices. In other words: the vehicle is equipped in all cases with a brake slip controller and can have any desired combination of the further vehicle stabilizing devices.

If the differential lock assumes the first operating state, i.e. is preselected, the braking assistant and/or the traction slip controller and/or the electronic traction system and/or the vehicle movement dynamics controller are influenced in their operating mode, i.e. deactivated. That is to say the brake slip controller remains uninfluenced in terms of its operating mode, as a result of which a stable vehicle behavior is ensured at least when braking occurs. Depending on which of the further vehicle stabilizing devices specified above the vehicle has, said devices are influenced, i.e. deactivated, in terms of their operating mode.

If the differential lock assumes the second operating state, i.e. is activated, in addition to the vehicle stabilizing devices whose operating mode was already influenced when the differential lock was in the first operating state, the brake slip controller is also influenced in terms of its operating mode. That is to say, the brake slip controller and the braking assistant and/or the traction slip controller and/or the electronic traction system and/or the vehicle movement dynamics controller are influenced in terms of their operating mode. In specific terms, this means: both the brake slip controller and the further vehicle stabilizing devices which are present in the vehicle are influenced in terms of their operating mode.

The operating state of the differential locks can advantageously be set by the driver by activating a switching means. The following sequence applies to the setting of the at least one further operating state of the differential locks which is different from the non-switched operating state: first, the operating state of the differential lock which is effectively arranged between the front axle and the rear axle, the longitudinal differential lock, and then the operating state of the differential lock which is effectively assigned to the rear axle, the rear axle differential lock, and then the operating state of the differential lock which is effectively assigned to the front axle, the front axle differential lock, are set.

It has proven particularly advantageous that the driver is informed about the operating state of the differential lock and/or about the operating mode of the vehicle stabilizing device which is arranged in the vehicle and/or about possibly occurring faults by means of a display means. In particular, the displaying of faults which occur at the differential locks, or which occur owing to the operation of the differential locks, is of particular interest. The monitoring of faults for the differential lock is advantageously carried out as a function at least of a signal which represents the operating state of the differential lock.

As already mentioned, the operating state of the differential lock can be set by the driver by activating a switching means. The following fault monitoring system advantageously presents itself: a fault is detected if, after activation of the switching means in order to set an operating state of the differential lock which is different from the non-switched operating state, the predefined time period has passed without the differential lock assuming this operating state.

This fault monitoring can also be improved as follows: if a first predefined time period has passed without the differential lock assuming the second operating state, a vehicle stabilizing device with which locking of the wheels is prevented during a braking operation is influenced in terms of its operating mode. In addition or as an alternative, if a second predefined time period has passed above a predefined vehicle speed without the differential lock assuming the second operating state, this situation is communicated to the driver and/or a fault entry is made in a memory medium.

It is particularly advantageous that the device according to the invention or the method according to the invention can be implemented in a simple and cost-effective way in vehicles with all-wheel drive.

Further advantages will emerge from the following description and the appended drawing. At this point it is to be noted that any desired combination of the subclaims, and thus of the subject matters described in the subclaims, are conceivable.

The exemplary embodiment will be explained in more detail with reference to the drawings.

DETAILED DESCRIPTION OF THE INVENTION

Figure 1:
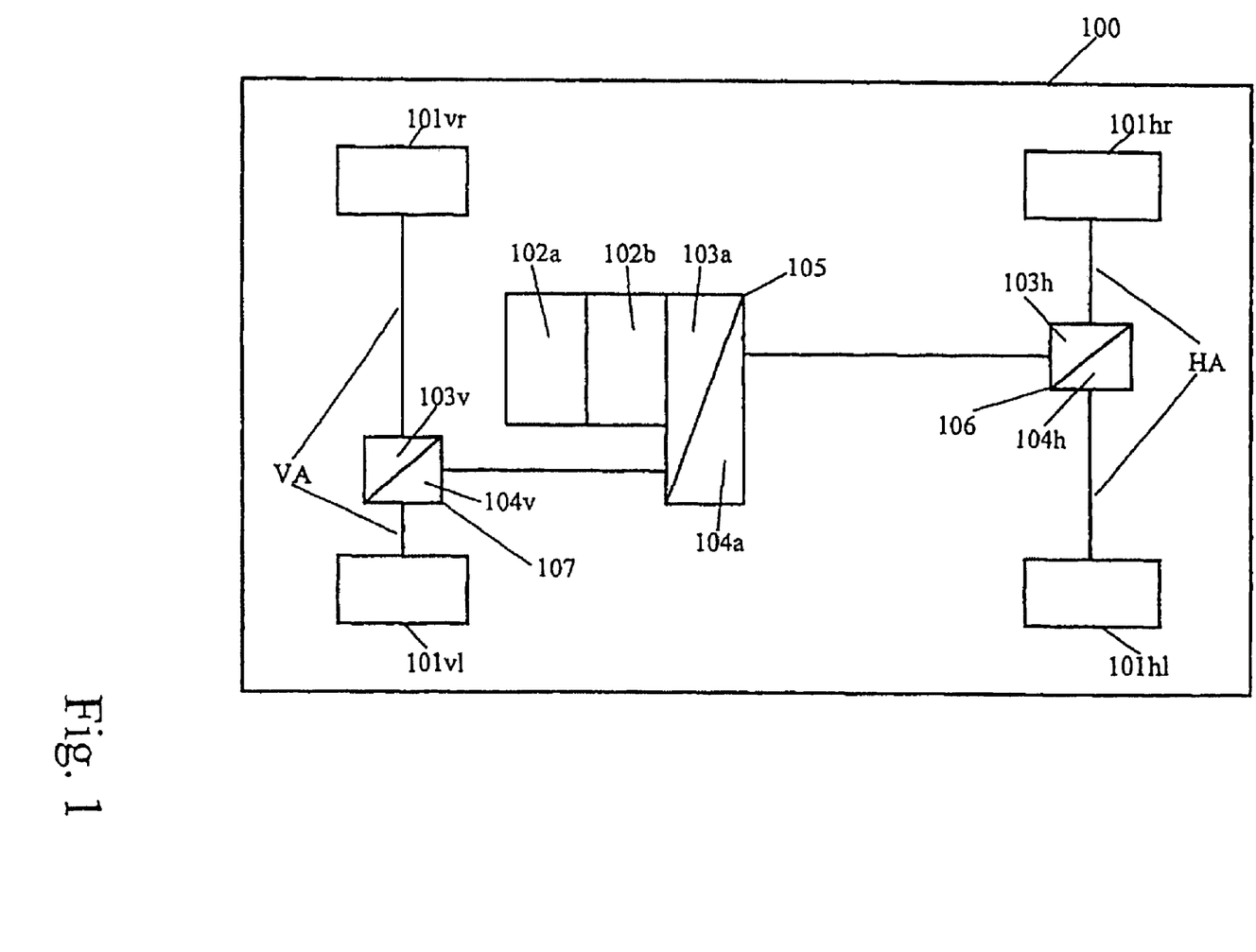
FIG. 1 is a schematic view of a vehicle with all-wheel drive or an off-road vehicle in which the device or the method according to the invention is used.

The schematic view in FIG. 1 shows a vehicle 100 which has vehicle wheels which are referred to by 101*ij* in an abbreviated notation. This abbreviated notation has the following meaning: the index i indicates that the wheel is a front wheel (v) or a rear wheel (h). The index j indicates whether it is a left-hand (l) or a right-hand (r) wheel. If this abbreviated notation is used in conjunction with other components, it has the same meaning there. In addition, the vehicle has an engine 102*a* and a transmission 102*b* which interacts with it.

The vehicle 100 will be a vehicle with all-wheel drive, or an off-road vehicle which is correspondingly equipped. For this reason, the vehicle 100 is equipped with a transfer gear 105 which is composed of a differential gear mechanism 103*a* and a differential lock 104*a*. The transfer gear 105 is operatively connected to the engine 102*a* via the transmission 102*b*, and serves the purpose of dividing the torque between the front axle VA and the rear axle HA. For this purpose, the transfer gear 105 is operatively connected to an axle gear 106 which is assigned to the rear axle HA and which is composed of a differential gear mechanism 103*h* and a differential lock 104h. In addition, the transfer gear 105 is operatively connected, for this purpose, to an axle gear 107 which is assigned to the front axle VA and which is composed of a differential gear mechanism 103v and a differential lock 104v.

At this point, the following should be noted with respect to the view of the transfer gear and the axle gear selected in FIG. 1: the view in the form of a comprehensive block which illustrates the transfer gear and the axle gears, with a diagonal dividing line, is intended to indicate merely that the respective gear mechanism is composed of two individual components, specifically in each case a differential gear mechanism and an associated differential lock. This representation merely has the function of representing the basic design of the gear mechanisms and is not intended to have a technologically active or functional meaning in terms of the axles or shafts which are connected to the comprehensive block.

For the sake of better understanding, a more detailed explanation of some of the components specified above will be given at this point.

In vehicles, differential gear mechanisms are used on the drive axle in order to compensate the rotational speed differences of the driven wheels which occur when cornering or are due to a different tire radius which is caused, for example, by fabrication tolerances of the tires or a different tire air pressure. Using differential gear mechanisms thus avoids forced slip between the wheels of the drive axle.

In roadway conditions with different traction at the drive wheels, the wheel with the low coefficient of friction determines the transmissible propulsion force of the vehicle and slips when there is an excess drive torque. This loss of traction can be reduced by a locking differential or by a differential lock (the two designations locking differential and differential lock are equivalent in meaning). Nowadays, a distinction is made between, on the one hand, positively locking, switchable differential locks and, on the other hand, frictionally locking, automatic differential locks. Positively locking differential locks connect both halves of the axle of the drive axle rigidly to one another in the activated, i.e. switched, state, which leads to forced slip and stress when cornering. In other words: with positively locking differential locks, a hundred percent mechanical, i.e. rigid coupling of the two wheels of the drive axle is implemented. Positively locking differential locks are also referred to as mechanical differential locks. In the context of the device and method according to the invention, the vehicle under consideration is to be equipped with such mechanical differential locks.

In comparison with a vehicle which is driven by a single axle, a dual-axle vehicle with all-wheel drive has three differential gear mechanisms 103a, 103h and 103v with the same number of differential locks 104a, 104h and 104v. A differential gear mechanism 103v and 103h with assigned differential lock 104v and 104h is provided on each of the two vehicle axles VA and HA. In addition, the vehicle has a transfer gear 105 which is arranged between the front axle and the rear axle and which is implemented as differential gear mechanism 103a with differential lock 104a. The two vehicle axles VA and HA are driven via the centrally arranged transfer gear 105 with a torque which is divided into two equal halves, or even divided asymmetrically.

To clarify once more the problems on which the device and the method according to the invention are based: if a vehicle with all-wheel drive is equipped with switchable mechanical differential locks, the vehicle axles VA and HA are mechanically coupled if the longitudinal differential lock 104a is activated. If the front axle differential lock 104v is activated, the wheels of the front axle are mechanically coupled. If the rear axle differential lock 104h is activated, the wheels of the rear axle are mechanically coupled. Consequently, a wheel-specific braking intervention, either an increase or a decrease in braking pressure, which is carried out independently of the driver, leads, when the differential locks are activated, to the mechanically coupled vehicle wheels and/or vehicle axles being influenced, and thus to the vehicle behavior being undesirably influenced. The device and method according to the invention are aimed at avoiding this.

Figure 2:
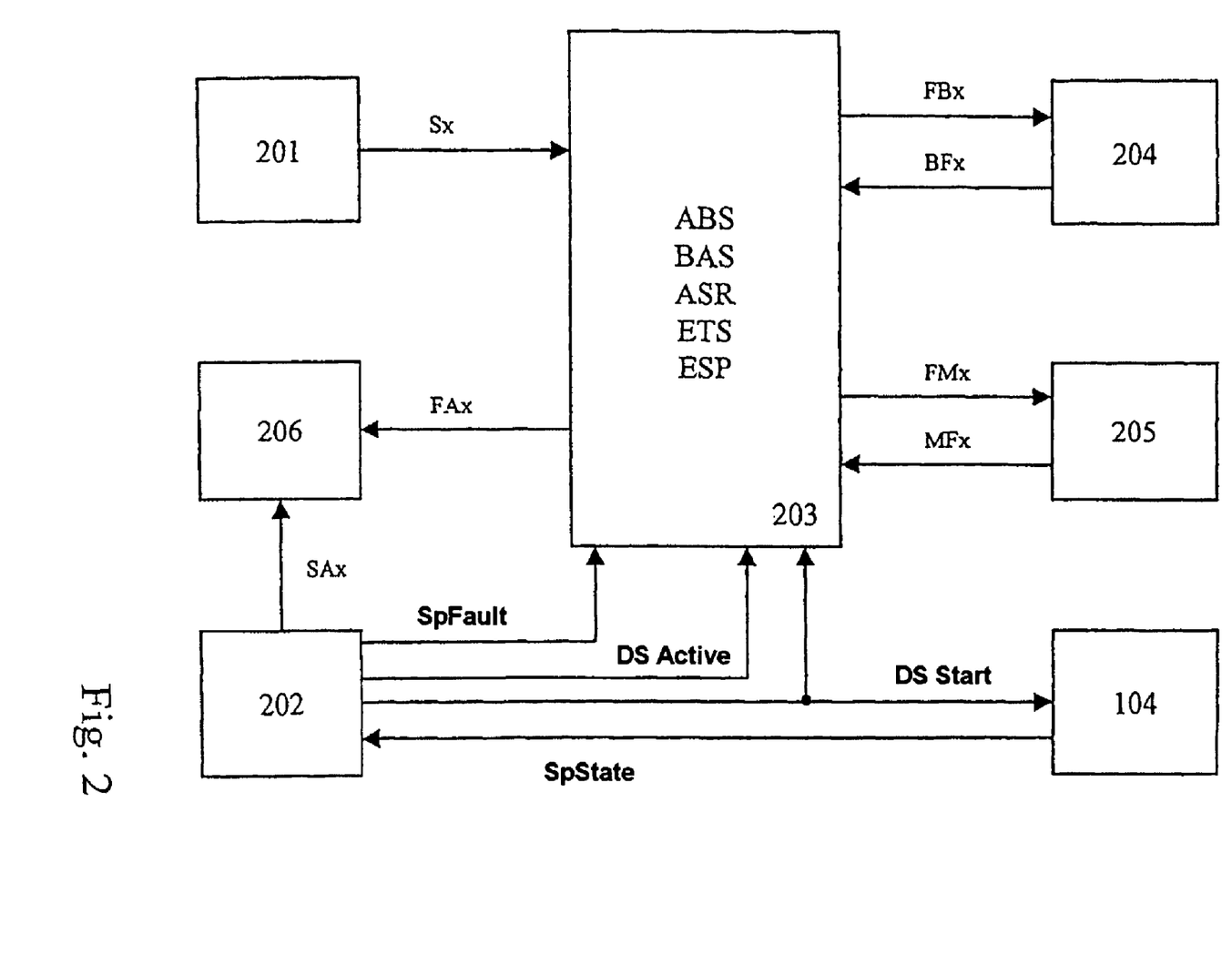
FIG. 2 is a schematic view of the device according to the invention.

In FIG. 2, block 203 represents the vehicle stabilizing device or devices arranged in the vehicle. Depending on the degree of equipment of the vehicle, the block 203 is either an individual vehicle stabilizing device or a plurality of vehicle stabilizing devices which operate according to different strategies. To be brief: the vehicle is equipped with at least one vehicle stabilizing device.

The form of the representation selected in FIG. 2 is not intended to have a restrictive effect. It is also conceivable for an independent block 203' to be provided for any individual device of the vehicle stabilizing devices which operate according to different strategies, said block being operatively connected, in accordance with block 203, to the other components illustrated in FIG. 2.

In a general form, i.e. irrespective of the specific configuration of the vehicle stabilizing device or devices arranged in the vehicle, the block 203 is connected to a block 201. The block 201 is the sensor system which is necessary for the operation of the vehicle stabilizing device or devices and which provides the block 203 with the respectively required input variables Sx for carrying out the corresponding regulating or control operation.

In addition, the block 203 is connected in a general form to a block 204 and to a block 205. The block 204 represents the brake actuators which are assigned to the individual vehicle wheel, which actuate using the signals FBx by the vehicle stabilizing device for carrying out wheel-specific braking interventions which are independent of the driver. If necessary, the vehicle stabilizing device receives feedback from the brake actuators about their operating state by means of the signals BFx.

For the sake of simplicity, in FIG. 2 the brake actuators 204ij which are respectively assigned to the vehicle wheels 101ij are combined to form a block 204. In addition, it is to be noted that the brake actuators may be part of a hydraulic or an electrohydraulic or a pneumatic or an electropneumatic or an electromechanical brake system. In the first four brake systems mentioned, the brake actuators are actuated valves via which brake medium is fed to a wheel brake cylinder or carried away from it. In the case of the brake system mentioned last, the brake actuators are electrically activated servomotors whose activation can generate a braking torque at the individual vehicle wheels. If the expression brake pressure is used in this description, this is not intended to constitute a restriction. In a corresponding way, the term braking force or some other term which describes a braking effect can also be used, allowing for the necessary technical changes.

The block 205 represents means for influencing the drive torque which is output by the engine. The drive torque which is to be output is set as a function of the signals FMx which are fed to the means 205 from the vehicle stabilizing device. If necessary, the vehicle stabilizing device receives feedback from the means 205 about its operating state by means of the signals MFx. The means 205 can be, for example, a throttle valve which is assigned to the engine, or an injection device.

As is apparent below from the specific description of the vehicle stabilizing devices arranged in the vehicle, the operating mode of the individual vehicle stabilizing device determines whether said device actuates the block 204 and/or the block 205.

The vehicle stabilizing devices have, considered in the context of the device or method according to the invention, the following in common: in order to stabilize the vehicle, they actuate, independently of the driver, at least individual brake actuators which are assigned to the vehicle wheels. In other words: they carry out wheel-specific braking interventions which are independent of the driver and by means of which braking pressure is increased or decreased.

The vehicle stabilizing device or the vehicle stabilizing devices may be, for example, the following:

A vehicle movement dynamics controller, which is known by the abbreviation ESP (Electronic Stability Program). Such a vehicle movement dynamics controller stabilizes the vehicle about its vertical axis. The transverse dynamics are therefore controlled. For this purpose, the set point value for the yaw rate of the vehicle is determined from the steering angle which is set by the driver, and the vehicle speed which is determined. This set point value is compared with an actual value for the yaw rate which is determined using a suitable sensor. During this comparison, the deviation of the actual value from the set point value is determined. Depending on this deviation, set point slip changes are determined for the individual wheels, with which changes the set point slip which is to be set at the respective wheel is modified. In order to set the modified set point slip values, braking interventions are carried out independently of the driver at the individual wheels 101*ij* of the vehicle by activating the respectively assigned brake actuators 204*ij*. The respective actual slip is approximated to the predefined set point slip for each individual wheel by means of these wheel-specific braking interventions. The brake pressure at individual wheels is usually increased by means of these braking interventions. As a result, a yaw moment which acts on the vehicle and which causes the vehicle to rotate about its vertical axis is brought about, as a result of which the actual value of the yaw rate is approximated to the associated set point value. Engine interventions with which the engine torque which is output by the engine is reduced can also be carried out in order to support the wheel-specific braking interventions which are carried out independently of the driver.

In the case of a vehicle movement dynamics controller, wheel speed sensors, a steering angle sensor, a transverse acceleration sensor, a yaw rate sensor and a sensor for determining the admission pressure which is set by the driver are combined in the block 201. The block 203 actuates the brake actuators, block 204, and the means for influencing the engine torque which is output by the engine, block 205.

An electronic traction system (ETS). This electronic traction system is activated if one of the drive wheels slips in a predefined speed range. The slipping wheel is braked, using braking interventions which are independent of the driver, until the wheel speed difference between the driven wheels of a vehicle axle drops below a predefined value. The braking intervention simulates, at the slipping wheel, the larger coefficient of friction of the opposite driven wheel. At the wheel which is at the higher coefficient of friction, the torque which is output is increased by the braking torque, and a locking effect is consequently produced. If an excessively large traction slip occurs when cornering in a pre-defined speed range, the vehicle instability which is caused as a result of this is decreased by a braking intervention on both sides.

The block 201 represents wheel speed sensors in the case of an electronic traction system. The block 203 actuates the brake actuators, block 204.

A traction slip controller (ASR). Using a traction slip controller, the vehicle is stabilized during a starting-up process in such a way that the driven wheels are prevented from slipping. As a result, interventions in the longitudinal dynamics are carried out. The traction slip controller operates, for example, according to the following principle: an actual value for the wheel slip is determined for each of the driven wheels. This actual value is compared with a threshold value. As long as the actual value is lower than the threshold value, instability does not occur, and no stabilizing interventions are necessary. However, if the actual value is higher than the threshold value, instability occurs and stabilizing interventions are necessary. If the threshold value is exceeded, the propulsion which is desired by the driver by activating the accelerator pedal, for example as a result of an excessively low coefficient of friction of the underlying surface, cannot be brought about. An excess of driving torque is present at the driven wheels, which causes driven wheels to slip, thus leading to a loss of lateral guidance. In order to restore the lateral guidance, stabilizing interventions are carried out. The stabilizing interventions are primarily braking interventions which are carried out at the driven wheels independently of the driver. Braking pressure is increased at the driven wheels by means of these braking interventions, as a result of which the excess of driving torque which is present at the driven wheels is decreased. Depending on the condition of the underlying surface, for example what is referred to as a μ-split situation may be present, the braking interventions which are independent of the driver are carried out on a wheel-specific basis, i.e. in a way which is adapted to the respective situation for each of the driven wheels. In order to support the braking interventions, it is also possible to carry out engine interventions with which the engine torque which is output by the engine is reduced. Of course, other variables for detecting spinning driven wheels can also be evaluated.

In the case of a traction slip controller, wheel speed sensors and means for preparing variables which represent the operating state of the engine, for example the engine torque which is output by the engine, are combined in the block 201. The block 203 controls the brake actuators, block 204, and the means for influencing the engine torque which is output by the engine, block 205.

A braking assistant (BAS). A braking assistant is intended to support the driver while he carries out braking operations, to the effect that, in the case of a braking operation which is initiated by the driver, the maximum possible braking force or braking deceleration in this situation is generated for this purpose activation of the brake pedal which is performed by the driver is monitored. If a predefined activation of the brake pedal is detected, braking interventions, which increase the braking force present at the individual vehicle wheels, are carried out independently of the driver. This can be done, for example, by feeding in brake pressure. The brake pressure is fed in until the locking limit is reached at the individual wheels. As a result, the lateral guidance for the individual wheels is retained together with optimum utilization of the braking effect. In order to detect the predefined activation of the brake pedal, for example the deflection angle or the deflection path of the brake pedal or the speed with which the brake pedal is activated are evaluated. A predefined activation occurs if a respectively associated threshold value is reached or exceeded.

In the case of a braking assistant, wheel speed sensors and means for determining the activation of the brake pedal are combined in the block 201. The block 203 actuates the brake actuators, block 204.

A brake slip controller (antilock brake system, ABS). Using a brake slip controller, the vehicle is stabilized during a brake operation to the effect that locking of the braked wheels is avoided. As a result, the longitudinal dynamics are stabilized. A brake slip controller operates, for example, according to the following principle, in each case an actual value for the wheel slip is determined for all the wheels of the vehicle. For each of the wheels, this actual value is compared with a threshold value. As long as the actual value is lower than the threshold value, no instability is present and no stabilizing interventions are necessary. However, if the actual value is higher than the threshold value, instability occurs and stabilizing interventions are necessary. If the threshold value is exceeded, there is a risk of the individual wheels of the vehicle locking because, for example, the underlying surface has a very low coefficient of friction. A locking wheel can no longer transmit any lateral guiding force, as a consequence of which there is a loss of lateral guidance. In order to restore the lateral guidance, stabilizing interventions are carried out. These stabilizing interventions are braking interventions which are carried out independently of the driver and with which the fed-in brake pressure is decreased at the wheels at which there is a risk of locking. Since the behavior of the individual wheels is different depending on the condition of the underlying surface, the braking interventions which are independent of the driver are carried out in a way which is adapted in a wheel-specific fashion, i.e. for each individual vehicle wheel. Of course, other variables can also be evaluated in order to detect a risk of locking.

In the case of a brake slip controller, the block 201 represents wheel speed sensors. The block 203 actuates the brake actuators, block 204.

The above statements relating to the individual vehicle stabilizing devices are exemplary and are not intended to have a restrictive effect. Of course, modified embodiments of the individual vehicle stabilizing devices are also intended to be included. The present listing of vehicle stabilizing devices which carry out braking interventions which are independent of the driver in order to stabilize the vehicle is also not intended to be conclusive. Of course, further vehicle stabilizing devices which operate according to this principle may be arranged in the vehicle. Moreover, the vehicle can also be equipped with vehicle stabilizing devices which carry out other interventions than braking interventions which are carried out independently of the driver.

Block 202 represents a switching means with which the driver can set the operating state of the differential locks 104 which are arranged in the vehicle. That is to say, by activating the switching means 202, the driver can predefine whether the differential locks which are arranged in the vehicle are to assume the non-switched operating state or an operating state which is different from this non-switched operating state. It is conceivable that, by activating the switching means 202, the operating state can be set for a single differential lock or for a predefined combination of differential locks or for all the differential locks together. The following combinations result depending on the sequence with which the differential locks which are arranged in a vehicle with all-wheel drive are preselected or activated: the single longitudinal differential lock, the longitudinal differential lock together with the rear axle differential lock or all three differential locks simultaneously. The switching means 202 is configured in a corresponding way in order to be able to set these combinations.

Since the longitudinal differential lock is always preselected or activated in the case of a preselection or activation of the differential locks, the following configurations are possible based on the longitudinal differential locks:

None of the differential locks is preselected. Consequently, all of the vehicle stabilizing devices which are specified above are active, and none is deactivated. Braking interventions which are independent of the driver take place in an unrestricted fashion.

The longitudinal differential lock is preselected. In this case, all the vehicle stabilizing devices are deactivated with the exception of the brake slip controller. Only the brake slip controller can still carry out braking interventions which are independent of the driver.

The longitudinal differential lock is activated. In this case, all the vehicle stabilizing devices which are arranged in the vehicle, that is to say also the brake slip controller, are deactivated. No braking interventions which are independent of the driver can be carried out any more.

On the one hand, the switching means 202 outputs a signal DS start which is fed to the block 203 and to the differential locks 104. On the other hand, a signal DS active, which is fed to the block 203, is output by the block 202. At this point it is to be noted that, in FIG. 2, the differential locks 104a, 104v and 104h which are arranged in the vehicle 100 are combined to form a block 104, for the sake of simplicity.

If at least one of the differential locks is to assume, or if the differential locks are to assume, an operating state which is different from the non-switched operating state, in particular the first operating state, the driver must place the switching means in a first position, as a result of which a first signal level, for example a low level, is output for the DS start signal. The DS start signal is active in this case. As a result, at least one of the differential locks assumes, or the differential locks assume, the first operating state, i.e. they are preselected. In addition, the operating mode of some of the vehicle stabilizing devices combined to form the block 203 is influenced, i.e. some of these vehicle stabilizing devices are deactivated.

Owing to the sequence which has already been described and in which the differential locks are preselected, the longitudinal differential lock is firstly preselected by the driver placing the switching means in the first position. The vehicle stabilizing devices which are deactivated are the vehicle movement dynamics controller and/or the electronic traction system and/or the traction slip controller and/or the braking assistants.

If the differential locks are to assume the non-switched operating state again, the driver must move the switching means into a second position, as a result of which a second signal level, for example a high level, is output for the DS start signal. That is to say, the signal DS start is reset and is inactive. The longitudinal differential lock is no longer preselected. The vehicle stabilizing devices which are specified above are activated again.

The respective state of the differential locks 104 is signaled back to the switching means 202 by means of signals Sp state. These signals are processed using a logic which is contained in the switching means 202. If the signals Sp state signal that at least one of the differential locks has assumed the activated state, the logic for the signal DS active outputs a first signal level, for example a low level (2 volts). As a result, the operating mode of all the vehicle stabilizing devices which are contained in the vehicle and which carry out braking interventions which are independent of the driver is influenced, i.e. all of these vehicle stabilizing devices are deactivated. In the specific case, the first signal level is output if the longitudinal differential lock is activated. As a result, the brake slip controller is also deactivated. Depending on the further vehicle stabilizing devices with which the vehicle is equipped, the vehicle movement dynamics controller and/or the electronic traction system and/or the traction slip controller and/or the braking assistant remain deactivated.

If, on the other hand, the signals Sp state signal that none of the differential locks is in the switched operating state, i.e. all the differential locks are deactivated, the logic outputs a second signal level, for example a high level (4 volts) for the signal DS active. As a result, the operating mode is again influenced only for some of the vehicle stabilizing devices mentioned above, i.e. again only some of these vehicle stabilizing devices are deactivated.

Lighting means, for example light-emitting diodes, are advantageously mounted on the switching means and are used to indicate whether a differential lock, or which differential lock, is preselected or active.

At this point it is to be noted once more that the sequence with which the differential locks can be preselected or activated is defined as follows: at first the longitudinal differential lock, then the rear axle differential lock and then the front axle differential lock.

Block 206 represents a display means with which the driver is informed about the operating state of the differential locks 104 and/or about the operating mode of the vehicle stabilizing device or devices 203 which are arranged in the vehicle and/or about possibly occurring faults. For this purpose, signals SAx which contain information about the operating state of the differential locks or possibly about faults which occur at them are fed to the display means 206 from the block 202. In addition, signals FAx which contain information about the operating mode of the vehicle stabilizing devices which are arranged in the vehicle and which carry out braking interventions which are independent of the driver in order to stabilize the vehicle, or about faults occurring at said devices, are fed to the display means 206 from the block 203. This information is conditioned or evaluated in the display means and presented to the driver.

If it is detected in block 202 that a fault is present for one of the differential locks, a signal Sp fault is generated in the block 202 and is fed to the block 203 and a fault entry is made in the block 203 as a function of said signal.

Figure 3:
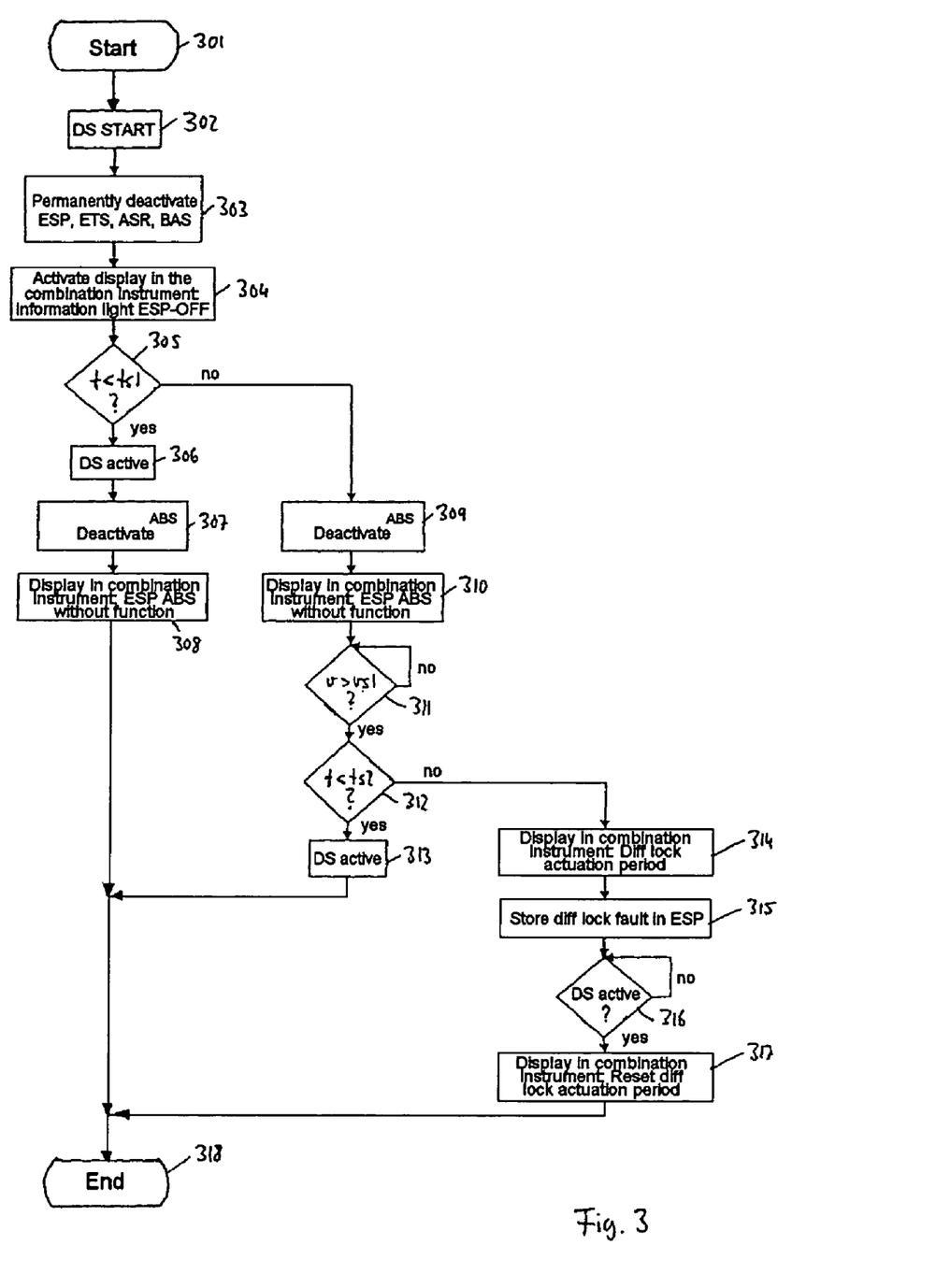
FIG. 3 is a schematic view of the method according to the invention which takes place in the device according to the invention.

FIG. 3 illustrates a method according to the invention in a flowchart which represents a switching logic.

The method according to the invention starts with a step 301 which is followed by a step 302. In step 302, the signal DS start is assigned the low level since the switching means 202 is activated by the driver, on the basis of which activation the differential locks are to assume an operating state other than the non-switched operating state, i.e. are to be preselected. A first signal level is assigned to the signal DS start, i.e. it is set. In the present case, at least the longitudinal differential lock is to be preselected. The step 302 is followed by a step 303 in which the operating mode of the vehicle stabilizing devices which are the vehicle movement dynamics controller and/or electronic traction system and/or traction slip controller and/or braking assistant is influenced, i.e. these vehicle stabilizing devices are deactivated or switched off. Subsequent to step 303, a step 304 is carried out. In this step, the driver is shown, using a display means which is an "ESP-OFF" information light which is arranged in the combination instrument, that the vehicle stabilizing devices specified above are deactivated. The steps 302, 303 and 304 relate to the preselection of a differential lock.

Subsequent to the step 304, a step 305 is carried out in which a time period t is compared with a first threshold value ts1. The time period t represents the time period which has passed between the time at which the longitudinal differential lock has been preselected, and the time at which the longitudinal differential lock is activated. A value of 5 seconds is assumed, for example, for the first threshold value. If the time period t is shorter than this first threshold value ts1, i.e. if the longitudinal differential lock has been activated before the time period represented by ts1 has expired, fault-free operation of the longitudinal differential lock is occurring, and a step 306 is carried out adjacent to the step 305. In this step 306, the signal DS active is set, i.e. a first signal level is assigned to it. The signal level assignment which is carried out in step 306 leads to a situation in which, in the subsequent step 307, the brake slip controller is deactivated in addition to the vehicle stabilizing devices which have already been deactivated in step 303. In the subsequent step 308, the deactivation of the brake slip controller is communicated to the driver. This can be done, for example, by means of a corresponding text message in a multifunctional display and/or by means of a corresponding indicating light. Subsequent to the step 308, a step 318 is carried out with which the method according to the invention is terminated.

If, in contrast, it is detected in step 305 that the time period t is longer than the first threshold value ts1, i.e. that the longitudinal differential lock has not been activated within the time period represented by ts1, it is to be assumed that the fault is possibly present during the operation of the longitudinal differential lock. In this case, subsequent to the step 305, a step 309 is carried out in which the brake slip controller is deactivated in accordance with the step 307. Subsequent to the step 309, a step 310 is carried out in which the driver is informed in accordance with the step 308.

Subsequent to the step 310, a step 311 is carried out in which it is checked whether the vehicle is moving at a predefined minimum speed. For this purpose, the value of the current vehicle speed is compared with a corresponding threshold value vs1, which is, for example, 5 km/h. If the current vehicle speed is lower than the threshold value vs1, the step 311 is carried out again. If, in contrast, the current vehicle speed is higher than the threshold value vs1, a step 312 is carried out subsequent to step 311. In this step 312, the time period t which has already been mentioned above is compared with a second threshold value ts2. This second threshold value has a higher value than the first threshold value, for example 30 seconds. If it is detected in step 312 that the time period t is shorter than the second threshold value ts2, i.e. if the longitudinal differential lock has been activated before the time period represented by ts2 has expired, fault-free operation of the longitudinal differential lock is occurring, for which reason a step 313 is carried out subsequent to the step 312. In this step 313, the signal DS active is set in accordance with the procedure in step 306, i.e. the first signal level is assigned to said step. In accordance with the step 307, this value assignment brings about a situation in which the brake slip controller is also deactivated. Steps corresponding to the steps 307 and 308 have not been inserted at this point in FIG. 3. Subsequent to step 313, the step 318 is carried out.

If, in contrast, it is detected in step 312 that the time period t is longer than the second threshold value ts2, i.e. that the preselected longitudinal differential lock has not been activated within the time period represented by ts2 while the vehicle is rolling (see step 311), it must be assumed that there is a fault in the longitudinal differential lock or in the lock system. That is to say a mechanical lock problem has occurred. For this reason, a corresponding fault display is issued in the combination instrument, to be more precise in a multifunction display, in step 314 which is subsequent to step 312. Subsequent to the step 314, a step 315 is carried out in which a fault entry is made in the vehicle stabilizing device. The signal DS active is not set since the longitudinal differential lock is not activated.

Subsequent to the step 315, a step 316 is carried out in which it is checked whether the signal DS active is still set. If it is detected in step 316 that the signal DS active is still not set, which is equivalent to the longitudinal differential lock still not having been activated, and that consequently a fault is still present in the longitudinal differential lock, the step 316 is then carried out again. If, in contrast, it is detected in step 316 that the signal has been set in the meantime, which is equivalent to the longitudinal differential lock having been activated in the meantime, and that accordingly it is possible to assume that the longitudinal differential lock is operating free of faults again, a step 317, in which this content is communicated to the driver by a corresponding display in the combination instrument, is carried out subsequent to the step 316. Subsequent to the step 317, the step 318 is carried out.

By using the method according to the invention described above, it is ensured that, even in the case of a line break and/or a line short circuit, the operating mode of the vehicle stabilizing devices which carry out braking interventions which are independent of the driver in order to stabilize the vehicle is influenced in good time. In other words: if the signals DS-START and/or DS-ACTIVE fail owing to a line break or line short circuit, the redundancy of these two signals ensures that the vehicle stabilizing devices are switched off or deactivated in all cases. Furthermore, the failure of one of these two signals to occur is detected and a corresponding fault message is triggered in the multifunctional display of the combination instrument.

At this point, it is to be noted that the electronic braking force distribution function which is implemented in the vehicle has to be ensured even when locks are active. A failure of this function is indicated to the driver.

As is apparent from the statements above, the method according to the invention which is illustrated in FIG. 3 contains a fault monitoring means, which can be used to detect faults which occur at the differential locks or which occur owing to the operation of the differential locks. This fault monitoring is based on the evaluation of time windows (steps 305 and 312) in combination with checking of the speed of the vehicle (step 311).

In particular, owing to the time-based interrogations, a certain amount of time is necessary until it is unambiguously clear whether or not a fault is present. For this reason, it is appropriate to use an alternative fault monitoring process which dispenses both with the speed-based and with the time-based interrogations. This alternative, improved fault monitoring process is described below.

The alternative fault monitoring process takes place in the block 202 represented in FIG. 2. In addition to the two signals DS start and DS active, which are generated in any case in the block 202 and are thus available in it, a further signal, which is fed to the block 202 from the block 203, is evaluated in the block 202 in conjunction with the alternative fault monitoring process. In order to generate this further signal, the block 203 requires information about the wheel speeds of the individual vehicle wheels. Since all the vehicle stabilizing devices which are presented in conjunction with the block 203 have wheel speed sensors, this further signal can be provided by all these vehicle stabilizing devices. However, in what follows it should be assumed that this further signal is provided by the vehicle movement dynamics controller (ESP) contained in the block 203, but this is not intended to have a restrictive effect.

Using this further signal, it is communicated to the block 202 that one of the differential locks, at least the longitudinal differential lock according to the above statements relating to FIG. 3, is active. This information is generated in the block 203 as follows: if a braking process occurs in which the brake slip controller intervenes, i.e. if braking interventions are carried out at at least one vehicle wheel in such a way that this braked wheel is prevented from locking, the wheel speeds of the wheels of one axle, for example of the front axle or the rear axle, are compared with one another. The wheel speeds of the axle on which there is the wheel at which the braking interventions are carried out within the scope of the brake slip control are preferably compared with one another. If, for example, the left-hand and the right-hand rear wheels have the same wheel speed, this is a sign that the differential lock which is assigned to the rear axle is active. As stated above, a corresponding evaluation can also be carried out by means of the front wheels.

In summary, it is possible to state: when braking with an ABS controller, an active differential lock can be unambiguously detected by means of the distribution of the wheel speed values. An active differential lock occurs if the wheel speeds have the same value for at least one axle of the vehicle, specifically for the axle which is operatively connected to the active differential lock. Of course, an active differential lock can also be detected by evaluating all of the wheel speeds. Using the alternative fault monitoring process ensures that a corresponding reaction is carried out, associated with a corresponding display, only when an actual fault is detected.

If the alternative fault monitoring process, during which mechanical coupling of the axles is detected during an ABS braking maneuver, is used in the method according to the invention, this means, for the representation of the method according to the invention in FIG. 3, that the steps which relate to the original fault detection, i.e. the steps 305 to 317, are to be replaced by steps which relate to the alternative fault detection means. However, at least the steps 305 and 312 which relate to the chronological evaluation (stepped time window) and the step 311, during which a speed-based evaluation takes place, are no longer necessary.

Essentially, the following sequence of the method according to the invention is then produced: after the method according to the invention has started, both the previous signals DS start and DS active and the further signal, which is generated in the block 203 and fed to the block 202, are read in and evaluated. Depending on the result which is obtained then, some or all of the vehicle stabilizing devices are then deactivated and corresponding displays or fault entries are generated. Alternatively, however, all the vehicle stabilizing devices remain active.

In the original fault monitoring process in which the two signals DS start and DS active are evaluated in isolation, a malfunction cannot be detected unambiguously in respect of all possible line faults (line break or line short circuit) and/or mechanical faults. This is now possible by virtue of the fact that a further signal is evaluated during the alternative fault monitoring process.

In the following table 1, all the possible signal states are represented for the signals DS start and DS active which are to be evaluated during the alternative fault monitoring process, as well as the further signal which is generated in the block 203 and fed to the block 202 and is designated below as DS hard, and said signal states are combined to form eight different system states. The following signal levels are assigned to the values 1 and 0 which are entered in this table: the value "1" corresponds to the low level (2 volts), and the value "0" corresponds to the high level (4 volts).

TABLE 1

| System state | DS start | DS active | DS hard |
|---|---|---|---|
| 1 | 1 | 1 | 1 |
| 2 | 1 | 0 | 0 |
| 3 | 0 | 1 | 1 |
| 4 | 0 | 0 | 1 |
| 5 | 0 | 0 | 0 |
| 6 | 1 | 0 | 1 |
| 7 | 0 | 1 | 0 |
| 8 | 1 | 1 | 0 |

The following table 2 shows which state the individual vehicle devices which are arranged in the vehicle assume in the system states in the top table 1.

TABLE 2

| | ESP | | ASR/ETS | | ABS | | BAS | |
|---|---|---|---|---|---|---|---|---|
| System state | Active | Passive | Active | Passive | Active | Passive | Active | Passive |
| 1 | | X | | X | | X | | X |
| 2 | | X | | X | X | | | X |
| 3 | X | | X | | X | | X | |
| 4 | X | | X | | X | | X | |
| 5 | X | | X | | X | | X | |
| 6 | | X | | X | X | | | X |
| 7 | | X | | X | | X | | X |
| 8 | | X | | X | | X | | X |

The individual system states will be described below.

System State 1:

In this system state, the vehicle is to travel in a locked fashion, i.e. all the differential locks which are present in the vehicle are active or activated. This means in turn that, according to the invention, all the vehicle stabilizing devices are deactivated, i.e. switched to the passive setting. In this system state there is an option to return to the normal state (system state 5). The three signals under consideration assume the anticipated values. The driver has preselected the differential locks, for which reason the signal DS start has the value 1. Owing to the preselection, the differential locks have been activated, for which reason the signal DS active has the value 1. The activated differential locks are also indicated by the value 1 of the signal DS hard. The three signals are plausible with respect to one another, and consequently there is no fault present.

System State 2:

In this system state, the driver is intended to have preselected the differential locks by activating the switching means 202. The differential locks thus assume an operating state other than the non-switched operating state, but they are not intended to be active yet. Consequently, the vehicle movement dynamics controller (ESP) and the traction slip controller (ASR) and the electronic traction system (ETS) and the braking assistant (BAS), of the vehicle stabilizing devices, are deactivated according to the invention. The brake slip controller (ABS) is still active. The three signals under consideration assume the anticipated values. The driver has preselected the differential locks, for which reason the signal DS start has the value 1. The differential locks are only intended to be preselected in this system state and not yet activated, for which reason the signal DS active has the value 0. Since the differential locks are not yet activated, the signal DS hard also has the value 0. The three signals are plausible with respect to one another, and consequently there is no fault present.

System State 3:

This system state occurs if the driver would like to change the differential locks from the activated state to the deactivated state by corresponding activation of the switching means 202. The system is therefore in the lock deselection system state.

As long as the differential locks are engaged, i.e. activated, the vehicle stabilizing devices are firstly deactivated according to the invention, i.e. switched to the passive setting. Immediately after the driver has initiated the deactivation of the differential locks by activating the switching means 202, checking is carried out for a predefined time period, which is, for example, 3 seconds, to determine whether the vehicle is in a stable state or whether the vehicle has a stable driving behavior. All the vehicle stabilizing devices are not switched to the active setting again until this is the case for the predefined time period. If the vehicle happens to behave in an unstable way during the predefined time period, or if the driving state of the vehicle happens to be unstable during this time period, the checking is started again, the vehicle stabilizing devices remain deactivated and the vehicle behavior is checked again for the predefined time period.

If the vehicle is stationary and the driver switches off the engine in order to deselect the locking directly after the switching means 202 has been activated, and switches the engine on again directly, the vehicle stabilizing devices at first remain switched to the passive setting until the differential locks are disengaged again.

The three signals under consideration assume the anticipated values. The driver has activated the switching means 202 in order to initiate the deactivation of the differential locks, for which reason the signal DS start has the value 0. Since the differential locks have not yet been deactivated in the system state under consideration, the signal DS active has the value 1. In addition, the differential locks which are still activated are indicated by the value 1 of the signal DS hard. The three signals are plausible with respect to one another, and consequently there is no fault present.

At this point, it is to be noted that the entry in table 2 for the third system state corresponds to the state of the vehicle stabilizing devices after the differential locks have been deactivated. The vehicle stabilizing devices are consequently active again.

System State 4:

The fourth system state is a system state in which the three signals which are illustrated in table 1 have implausible values.

If the signal DS hard were to have the correct value, this would mean that both the signal DS start and the signal DS active would have an incorrect value. There would therefore have to be line interruptions both for the signal DS start and for the signal DS active. This would mean that there would be a double fault present. However, this cannot be the case owing to the specific technical embodiment.

Consequently, in the signal combination illustrated in table 1, the signal DS hard has an incorrect value, and the two signals DS start and DS active have the correct values. That is to say, it is possible to assume that the differential locks have neither been preselected nor activated. For this reason, it is not necessary to deactivate the active vehicle stabilizing devices. For this reason, when the signal combination which is illustrated for this system state in table 1 is present, it is not possible to take any measures to influence the vehicle stabilizing devices. All the vehicle stabilizing devices remain activated since none of the differential locks can be activated owing to the signal combination. There is also no fault display in the combination instrument.

It is also impossible to deactivate the vehicle stabilizing devices during an ABS braking operation since the signal DS-START does not have the value 1 and, accordingly, the checking to determine whether or not the differential locks are engaged (relates to the steps 303 et seq. illustrated in FIG. 3) is not carried out.

System State 5:

The fifth system state is the normal state in which the driver has not preselected the differential locks. The differential locks are thus not active either. Accordingly, according to the invention, all the vehicle stabilizing devices are active.

The three signals under consideration assume the anticipated values. Since the driver has not made any preselection, the signal DS start assumes the value 0. Since the differential locks are not active, both the signal DS active and the signal DS hard assume the value 0. The three signals are plausible with respect to one another and consequently there is no fault present.

According to the statements relating to system state 3, this normal state is not assumed until after a predefined time period during which the behavior of the vehicle is checked, starting from the system state in which the differential locks are activated, and accordingly the vehicle stabilizing devices are switched to the passive setting.

System State 6:

In the system state under consideration here, it is assumed that the driver has preselected the differential locks by activating the switching means 202. For this reason, the signal DS start has the value 1. The differential locks should also be engaged, i.e. active. This is displayed by the value 1 of the signal DS hard. However, the value 1 which is anticipated for the signal DS active owing to the activated differential locks is not present, and instead the signal DS active has the value 0. For the signal DS active, a line short circuit to the battery voltage (high level, 4 volts) is thus present. That is to say, in the case of the signal combination illustrated in table 1, the signal DS active is faulty.

Since the two signals DS start and DS hard have implausible values with respect to one another, it is firstly assumed that the differential locks are in the preselected operating state. Owing to this assumption, the individual vehicle stabilizing devices are placed in the operating states, or remain in the operating states, which according to the invention, they would also assume when the differential locks are preselected. That is to say, the vehicle movement dynamics controller (ESP) and the traction slip controller (ASR) and the electronic traction system (ETS) and the braking assistant (BAS) are deactivated or remain deactivated. Only the brake slip controller (ABS) remains active. The brake slip controller remains active until a braking operation occurs in which the brake slip controller engages and braking interventions are performed at at least one vehicle wheel in such a way that this braked wheel is prevented from locking. If, during such a braking operation it is detected, for example by evaluating the wheel speeds, that the differential locks are engaged, the brake slip controller is also switched off. However, the brake slip controller is not switched off until the time at which the braking interventions which are to be carried out within the scope of the brake slip controller have ended. That is to say, the control process which has begun is still concluded. Hence, in the signal combination illustrated in table 1 for the system state 6, the vehicle stabilizing devices are operated as if the differential locks were preselected, the driver continues to be provided with a minimum degree of support because at least the brake slip controller is available to him.

After the differential lock is deactivated again, the vehicle stabilizing devices remain deactivated until the next ignition run, and a fault entry is made. In addition, a fault message is displayed in the combination instrument.

System State 7:

The signal combination illustrated in table 1 indicates an undefined operating state since this signal combination cannot be used to infer any definitive information as to whether the differential locks are activated or deactivated. If this phenomenon occurs after an ignition restart, all the vehicle stabilizing devices are immediately temporarily switched to the passive setting. This is illustrated in table 2.

If the signal DS active assumes the value 0, which would in fact be anticipated owing to the signal values of the two signals DS start and DS hard, and if the vehicle then behaves in a stable way for a predefined time period which is, for example, 3 seconds, the vehicle stabilizing devices are activated again, i.e. connected into the circuit.

When the signal combination which is illustrated in table 1 is present, no fault entry is made. The reason for this is as follows: the two signals DS start and DS active have the same value for each of the two system states 3 and 7, and there is no unambiguous information available about the operating state of the differential locks.

System State 8:

The eighth system state is a system state in which the three signals illustrated in table 1 have implausible values.

If the signal DS hard were to have the correct value, this would mean that both the signal DS start and the signal DS active would have an incorrect value. There would therefore have to be line faults present both for the signal DS start and for the signal DS active. This would mean that a double fault were present. However, this cannot be the case owing to the specific technical embodiment.

Consequently, with the signal combination illustrated in table 1, the signal DS hard has an incorrect value, and the two signals DS start and DS active have the correct value. That is to say it is possible to assume that the differential locks are activated. For this reason, when the signal combination illustrated in table 1 is present for this system state, the vehicle stabilizing devices are deactivated.

If the signals DE start and DS active assume the value 0 again, and if the vehicle then behaves in a stable fashion for a predefined time period, which is, for example, 3 seconds, the vehicle stabilizing devices are activated again, i.e. connected into the circuit.

The changes in the design of the device according to the invention or in the sequence of the method according to the invention which result from the above statements relating to the alternative fault monitoring process have not been taken into account in FIGS. 2 and 3 for reasons of clarity.

At least one brake slip controller (ABS) and one braking assistant (BAS) and/or one traction slip controller (ASR) and/or one electronic traction system (ETS) and/or one vehicle movement dynamics controller (ESP) are advantageously arranged in the vehicle as vehicle stabilizing devices. In other words: the vehicle is equipped with a brake slip controller in all cases, and can have any desired combination of the further vehicle stabilizing devices.

The invention claimed is:

1. A device for influencing the operating mode of at least one vehicle stabilizing device of a plurality of vehicle stabilizing devices which operate according to different strategies, which actuate, independently of the driver, at least brake actuators which are assigned to the vehicle wheels, in order to stabilize the vehicle, and which are arranged in the vehicle,
   wherein the vehicle has a front axle and a rear axle and is a two-axle vehicle with all wheel drive in which both the front axle and the rear axle are each effectively assigned a switchable differential lock,
   wherein a further switchable differential lock is arranged effectively between the front axle and the rear axle,
   wherein the differential locks assume, in addition to the non-switched operating state, a first operating state which is different from the non-switched operating state and in which the differential locks are preselected, and a second operating state which is different from the non-switched operating state and the first operating state and in which the differential locks are switched,
   wherein some of the vehicle stabilizing devices are influenced in terms of their operating mode when the further switchable differential lock arranged effectively between the front axle and the rear axle assumes the first operating state,
   wherein all the vehicle stabilizing devices are influenced in terms of their operating mode when the further switchable differential lock assumes the second operating state, and
   wherein the operating mode of the vehicle stabilizing devices is influenced in each case in such a way that actuation of the brake actuators which are assigned to the vehicle wheels by the respective vehicle stabilizing device independently of the driver does not occur.

2. The device as claimed in claim 1, wherein all the vehicle stabilizing devices which are arranged in the vehicle are influenced in terms of their operating mode when the differential lock assumes the first operating state, with the exception of that vehicle stabilizing device which, by actuating the brake actuators independently of the driver, prevents the vehicle wheels from locking during a braking operation.

3. The device as claimed in claim 1, wherein, when the differential lock changes over from the non-switched operating state into the switched operating state which corresponds to the second operating state, the first operating state is assumed before the second operating state.

4. The device as claimed in claim 1, wherein at least one brake slip controller and at least one of a braking assistant, a traction slip controller, an electronic traction system, and a vehicle movement dynamics controller are arranged in the vehicle as said vehicle stabilizing devices, wherein, if the differential lock assumes the first operating state, at least one of the braking assistant, the traction slip controller, the electronic traction system, and the vehicle movement dynamics controller is influenced in its operating mode, and wherein, if the differential lock assumes the second operating state, in addition to the vehicle stabilizing devices whose operating mode was already influenced when the differential lock was in the first operating state, the brake slip controller is also influenced in terms of its operating mode.

5. The device as claimed 4, wherein, if the differential lock assumes the second operating state, the brake slip controller and at least one of the braking assistant, the traction slip controller, the electronic traction system, and the movement dynamics controller are influenced in terms of their operating mode.

6. The device as claimed in claim 1, wherein the operating state of the differential locks can be set by the driver by activating a switching means, and wherein, at first the operating state of the differential lock which is effectively arranged between the front axle and the rear axle, then the operating state of the differential lock which is effectively assigned to the rear axle, and then the operating state of the differential lock which is effectively assigned to the front axle, are set.

7. The device as claimed in claim 1, wherein the driver is informed about at least one of the operating state of the differential lock, the operating mode of the vehicle stabilizing devices which are arranged in the vehicle, and possibly occurring faults, by a display means.

8. The device as claimed in claim 1, wherein at least one signal which represents the operating state of the differential lock is generated, and wherein fault monitoring of the differential lock is carried out as a function of this signal.

9. The device as claimed in claim 1, wherein the operating state of the differential lock can be set by the driver by activating a switching means, and wherein a fault is detected if, after activation of the switching means in order to set an operating state of the differential lock which is different from a non-switched operating state, a predefined time period has passed without the differential lock assuming this operating state.

10. The device as claimed in claim 9, wherein, if a first predefined time period has passed without the differential lock assuming the second operating state, a vehicle stabilizing device, with which locking of the wheels is prevented during a braking operation, is influenced in terms of its operating mode.

11. The device as claimed in claim 9, wherein, if a second predefined time period has passed above a predefined vehicle speed without the differential lock assuming the second operating state, communication to the driver is made, a fault entry in a memory medium is made, or both communication to the driver and a fault entry in the memory medium are made.

12. The device as claimed in claim 10, wherein, if a second predefined time period has passed above a predefined vehicle speed without the differential lock assuming the second operating state, communication to the driver is made, a fault entry in a memory medium is made, or both communication to the driver and a fault entry in the memory medium are made.

13. A method for influencing the operating mode of at least one vehicle stabilizing device of a plurality of vehicle stabilizing devices which operate according to different strategies, which actuate, independently of the driver, at least brake actuators which are assigned to the vehicle wheels, in order to stabilize the vehicle, and which are arranged in the vehicle, the vehicle having a front axle and a rear axle and being a two-axle vehicle with all wheel drive in which both the front axle and the rear axle are each effectively assigned a switchable differential lock, a further switchable differential lock being arranged effectively between the front axle and the rear axle, the differential locks assuming, in addition to the non-switched operating state, a first operating state which is different from the non-switched operating state and in which the differential locks are preselected, and a second operating state which is different from the non-switched and the first operating state and in which the differential locks are switched, comprising:

influencing some of the vehicle stabilizing devices in terms of their operating mode when the further switchable differential lock arranged effectively between the front axle and the rear axle assumes the first operating state, and influencing all the vehicle stabilizing devices in terms of their operating mode when the further switchable differential lock assumes the second operating state, wherein the operating mode of the vehicle stabilizing devices is influenced in each case in such a way that actuation of the brake actuators which are assigned to the vehicle wheels by the respective vehicle stabilizing device independently of the driver does not occur.

* * * * *